March 10, 1925.
A. W. MILLER
1,529,366
LIGHTING DEVICE FOR AUTOMOBILES
Filed Dec. 18, 1923
2 Sheets-Sheet 1
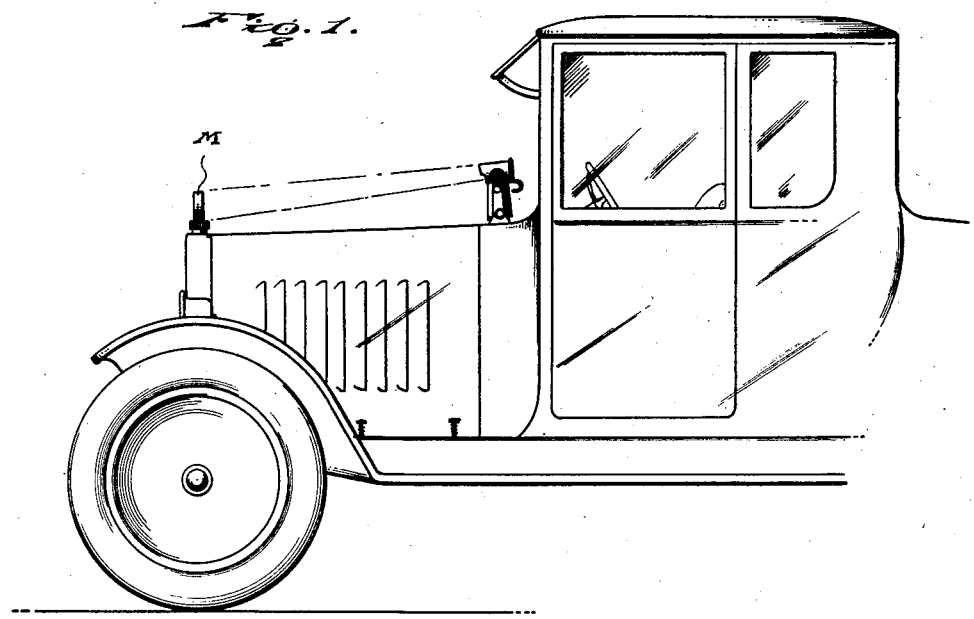
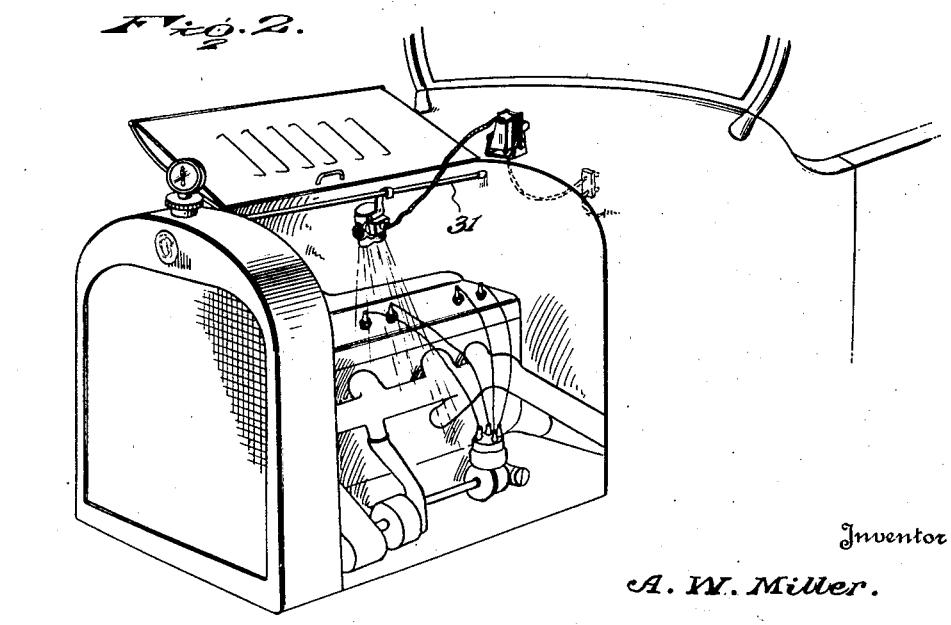
Inventor
A. W. Miller.
By Lacey & Lacey, Attorneys March 10, 1925.

A. W. MILLER 1,529,366

LIGHTING DEVICE FOR AUTOMOBILES

Filed Dec. 18, 1923

Inventor

A. W. Miller.

By

Lacy & Lacy, Attorneys

Patented Mar. 10, 1925.

1,529,366

UNITED STATES PATENT OFFICE.

ARTHUR WILLIAM MILLER, OF LINCOLN, NEW JERSEY.

LIGHTING DEVICE FOR AUTOMOBILES.

Application filed December 18, 1923. Serial No. 681,437.

*To all whom it may concern:*

Be it known that I, ARTHUR WILLIAM MILLER, a citizen of the United States, residing at Lincoln, in the county of Middlesex and State of New Jersey, have invented certain new and useful Improvements in Lighting Devices for Automobiles, of which the following is a specification.

This invention relates to improvements in automobile illumination appliances.

It is a well-known fact that those who employ motor meters on the radiators of their automobiles find it difficult to observe the same while driving at night. The present invention therefore has as its primary object to provide an illuminating device which may be conveniently mounted upon the cowl or hood of any automobile and may be adjusted to direct rays of light onto the motor meter so that the same may be observed and read with convenience thereby obviating overheating of the motor and other troubles which might otherwise result.

Another object of the invention is to provide a source of illumination, for the purpose stated, so mounted as to be capable of adjustment to any desired angle so as to direct the light rays directly onto the motor meter regardless of the contour of the cowl or radiator, so that the device will be universally applicable to automobiles.

Another object of the invention is to so construct the illuminating device that in a moment's time it may be partially dismounted and employed as a trouble light in the event repairs require to be made to the engine, carbureter, or other devices or mechanisms housed beneath the hood.

In the accompanying drawings:

Figure 1 is a side elevation of the device mounted upon the cowl of an automobile and adjusted to illuminate the motor meter;

Figure 2 is a perspective view illustrating the manner in which the device may be employed as a trouble light;

Figure 4:
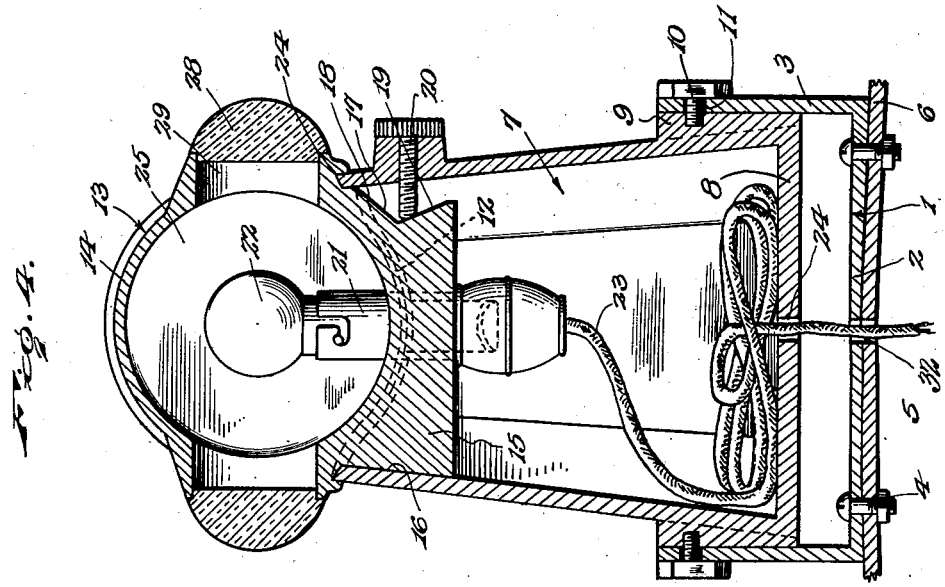
Figure 4 is a vertical transverse sectional view taken substantially on the line 4—4 of Figure 3 looking in the direction indicated by the arrows.
Figure 3:
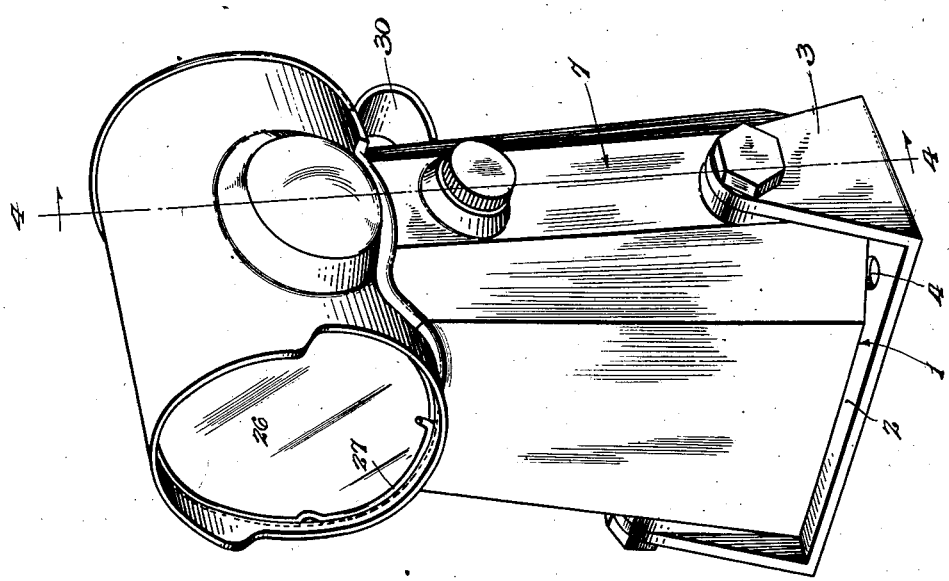
Figure 3 is a perspective view of the device dismounted.

The device embodying the invention comprises an attaching base bracket which is indicated in general by the numeral 1 and embodies a base portion 2 and upstanding bracket portions 3, the base portion 2 being provided with openings 4 for the passage of bolts or other suitable securing elements 5 which pass also through the cowl 6 of the automobile and serve to secure the base bracket in place upon the cowl. The device further comprises a hollow pedestal indicated in general by the numeral 7 and preferably of substantially the frusto-pyramidal form shown in the drawings although it may assume some other contour if found desirable or advisable. The pedestal 7 has a closed bottom 8, and at opposite sides it is formed exteriorly with bosses 9 which have flat outwardly presented faces which abut against the inner faces of the upstanding bracket members 3, binding screws 10 being fitted through openings 11 formed in the said bracket members 3 and being threaded into the said bosses 9. In this manner the pedestal 7 is supported upon the supporting base 1 with its bottom 8 spaced above the bottom or attaching member 2 of the said base member 1 a sufficient distance to permit of the pedestal being tiltably adjusted when the binding or set screws 10 are loosened, these screws being adapted to be tightened after the desired adjustment has been made, so as to secure the pedestal against displacement. The pedestal is open at its top and the upper edge of its wall, at the front and rear of the pedestal, is preferably cut away on a substantially arcuate line as indicated by the numeral 12 and for a purpose to be presently explained.

The illuminating device proper is indicated in general by the numeral 13 and the same comprises a substantially cylindrical casing 14 having a base 15 one side face of which is inclined downwardly and outwardly as indicated by the numeral 16, and the other or opposite face of which is formed with a recess 17 having relatively inclined walls 18 and 19. The base 15 of the lamp casing is removably fitted into the open upper end of the pedestal 7 and it will be observed that the last mentioned side of the said base is cut away to an extent to permit of slight displacement of the base and allow the face 16 of the said base to recede from its position resting against the inner side of the walls of the pedestal a sufficient distance to permit of withdrawal of the base from the pedestal. A set screw 20 is threaded through that side wall of the pedestal 7 which is opposed by the recessed side 17 of the base 15 and is adapted to be adjusted so as to bind in the angle between the walls 18 and 19 of the said recess 17 and preferably more directly against the wall 19 so as to securely hold the base 15 of the casing 14 within the open top of the pedestal 7. It will be evident at this point that when the set screw is tightened, a wedging effect will be produced tending to draw the base of the casing 14 downwardly firmly into the open top of the pedestal 7 so as to unite these parts in such a manner as not to impart any undue vibration to the electric light bulb which will presently be referred to and which is arranged within the said casing 14. The numeral 21 indicates an electric light bulb socket of the ordinary type which is mounted in the base of the casing 14, and a bulb 22 is fitted in the usual manner within the socket. A conductor wire or cable 23 is connected in the usual manner to the terminals of the socket 21, and a considerable length of the conductor is housed within the hollow pedestal 7, the conductor being led through an opening 24 in the bottom 8 of the pedestal 7 and to a switch upon the instrument board or dash of the automobile or to a switch located at any other convenient point. The casing 14 is preferably provided in its under side with a groove 24 in which the upper edge of the wall of the pedestal 7 is snugly received when the casing is in place upon the pedestal and it will be evident that by providing this groove, the casing is more firmly supported upon the pedestal and there is less likelihood of vibration.

In the rear end of the casing 14 there is either arranged a reflector or this end of the casing may be closed by an end wall 25 the inner surface of which will preferably be concave and of a reflecting character. Within the open front of the casing 14 there is arranged a lens 26 held in place, in the usual manner, by an expansible ring 27 so that by removal of the lens access may be gained to the interior of the casing for the purpose of removing and replacing the lamp 22. Lenses 28 are preferably arranged in openings 29 in the opposite sides of the casing 14 and, when viewed from the front, the right hand lens will be preferably red and the left hand lens green.

By reference to Figure 1 of the drawings it will be observed that the lighting device is to be mounted upon the cowl of the automobile, as previously explained, and that when adjusted to the proper angle of inclination, will direct its rays onto the motor meter which is indicated by the reference letter M in the said figure. Therefore, by the use of the device the driver of the automobile may, when driving at night, observe the motor meter with the same facility as during daylight hours.

As previously pointed out the lighting device is capable also of employment as a trouble light and in order that this may be effected, the casing 14 is provided at its rear end and at its lower side with a hook 30. After the casing 14 has been removed from the standard 7, in the event of engine trouble or difficulty experienced in connection with any of the other mechanisms housed beneath the hood of the automobile, the hook 30 may be engaged over the usual distance rod 31 which extends from the dash to the radiator and beneath the top of the hood, as illustrated in Figure 2 of the drawings, so that the rays from the lamp 22 will be directed upon the engine or other mechanism to be inspected and repaired. In order that the illuminating device proper indicated by the numeral 13, may be employed as a trouble light and more or less extensive use made of the same for this purpose, a considerable length of the conductor wire 23 will be stored within the pedestal 7 and it will be evident that the pedestal will therefore serve as a substantially weather-proof housing for the stored length of wire. The base portion 2 of the pedestal is preferably provided with an opening 32 for the passage of the conductor wires 23.

Having thus described the invention, what is claimed as new is:

1. An automobile lighting device comprising a hollow pedestal open at its top, a lamp casing having a base removably fitted into the open top of the pedestal, the said base having one side inclined to seat against the inner surface of the upper portion of one side wall of the pedestal, the opposite side of the base being cut away to permit of a slight lateral displacement of the base and removal of the same from the open top of the pedestal, the last mentioned side of the base having an inclined surface portion, a set screw adjustably fitted through the wall of the pedestal and coacting with the said inclined surface portion of the last mentioned side of the base, an electric light bulb socket mounted in the casing, and a conductor electrically connected with the said socket and having a surplus length stored within the pedestal.

2. An automobile lighting device comprising a base bracket including a bottom member and upstanding side members, a hollow pedestal disposed at its lower portion between the said side members of the base bracket, pivot elements engaged through the said side members of the base bracket and tiltably supporting the pedestal, a lamp casing removably fitted into the upper end of the pedestal, an electric bulb socket within the casing, the bottom of the pedestal and the bottom member of the bracket having oppositely located openings therein, and a conductor cord extending from said bulb socket, within the pedestal, and through the said openings in the pedestal and base bracket.

In testimony whereof I affix my signature.

ARTHUR WILLIAM MILLER. [L. S.]